UNITED STATES PATENT OFFICE.

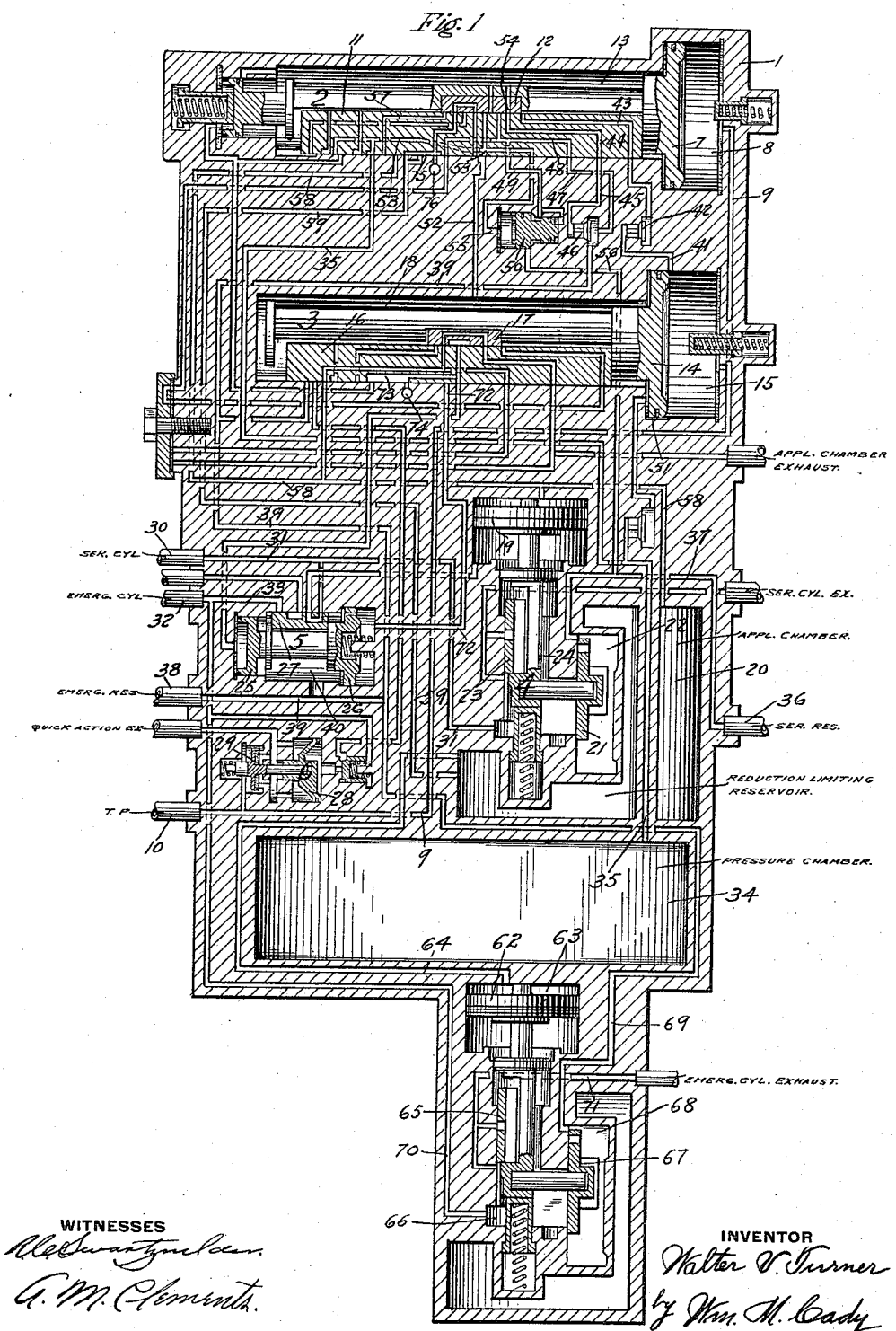

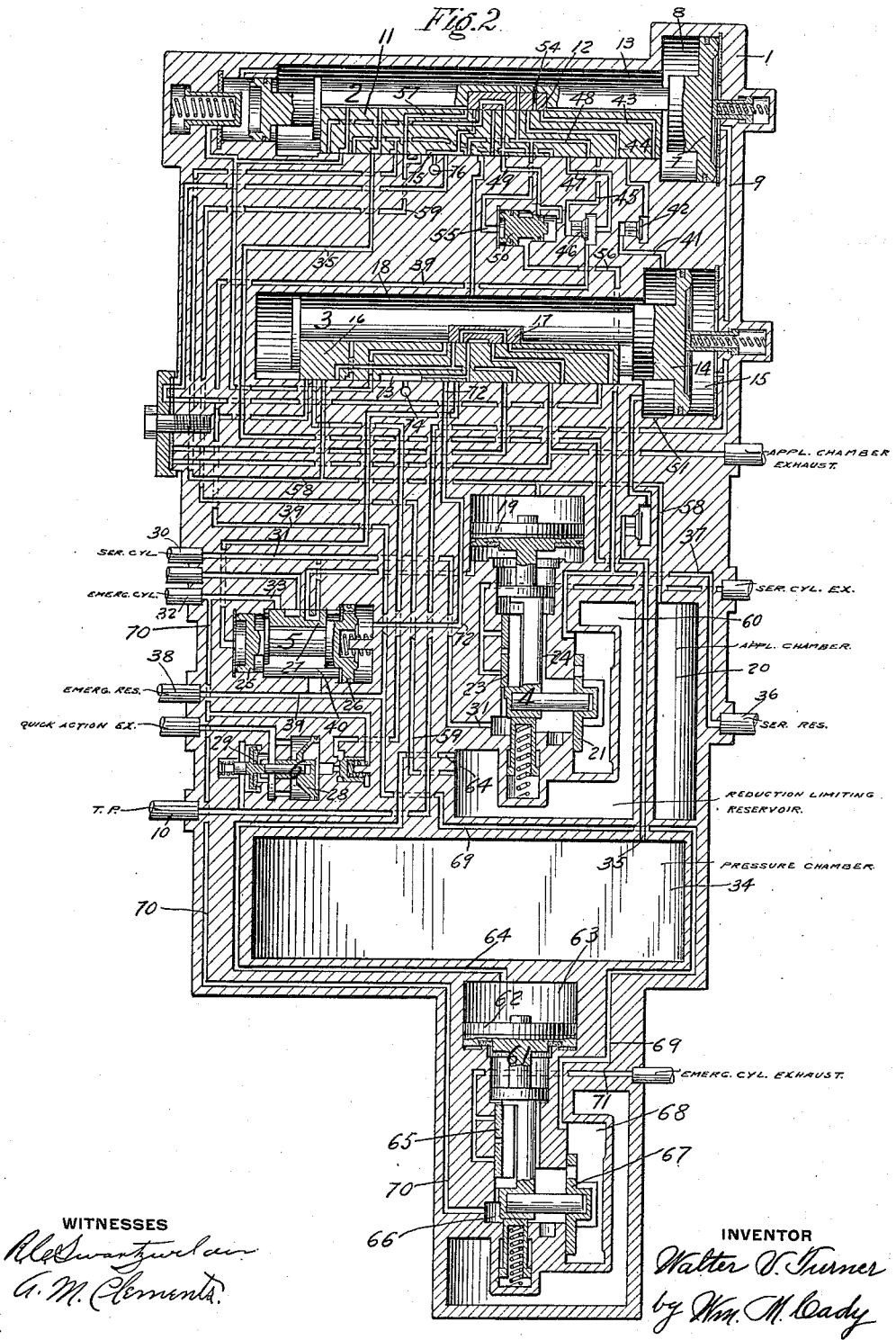

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

CONTROL-VALVE DEVICE.

1,160,468.

Specification of Letters Patent. Patented Nov. 16, 1915.

Application filed December 30, 1911. Serial No. 668,701.

*To all whom it may concern:*

Be it known that I, WALTER V. TURNER, a citizen of the United States, residing at Edgewood, in the county of Allegheny and State of Pennsylvania, have invented new and useful Improvements in Control-Valve Devices, of which the following is a specification.

This invention relates to fluid pressure brakes, and more particularly to a controlling valve mechanism adapted for obtaining a high braking power in service applications of the brakes.

In some classes of service, where it is important to make service stops in the shortest possible time, such as suburban traction service, it is highly desirable to be able to secure braking power considerably greater than can be obtained in service with the usual standard fluid pressure brake equipment.

In my prior Patent No. 1,011,528, dated December 12, 1911, is shown and described a valve mechanism for accomplishing the above purpose which has a second service position to which the valve mechanism moves after the usual equalization of the auxiliary reservoir into the brake cylinder. In this position fluid is supplied to the brake cylinder from an additional source of fluid pressure in graduated amounts corresponding with gradual reductions in train pipe pressure below the equalizing point, so that a much greater braking power may be obtained in service applications of the brakes.

The principal object of my present invention is to provide an improved valve mechanism of the above character for securing a high degree of braking power in service applications of the brakes.

In the accompanying drawings, Figure 1 is a sectional diagrammatic view of a brake control valve mechanism embodying my improvements, showing the parts in normal full release position and Fig. 2 a similar view, showing the parts in over-reduction service application position.

As a preferred construction, I have shown my improvement applied to a control valve device similar to that covered in my prior pending application Serial No. 618,218, filed March 31st, 1911, and comprising a casing 1 containing an equalizing portion 2, release portion 3, application portion 4, emergency portion 5, and quick action portion 6.

The equalizing portion 2 comprises a piston 7 contained in piston chamber 8 open to train pipe passage 9 leading to train pipe 10, and equalizing slide valve 11 and equalizing graduating valve 12 contained in valve chamber 13 and adapted to be operated by piston 7.

The release portion 3 comprises a piston 14 contained in piston chamber 15 open to train pipe passage 9 and release slide valve 16 and release graduating valve 17 contained in valve chamber 18 and adapted to be operated by piston 14.

The application portion 4 comprises a piston 19 subject on one side to the pressure of application chamber 20 and on the opposite side to brake cylinder pressure, an application valve 21 contained in valve chamber 22, and an exhaust valve 23 contained in valve chamber 24, both valves being operated by the application piston 19.

The emergency portion 5 comprises a differential piston having piston heads 25 and 26 and emergency slide valve 27 adapted to be operated by said differential piston.

The quick action portion 6 comprises a piston 28 and a train pipe vent valve 29 operated thereby for venting fluid from the train pipe.

Two brake cylinders are employed, a service brake cylinder connected to pipe 30 and passage 31 and an emergency brake cylinder connected to pipe 32 and passage 33. Pressure chamber 34 communicates with passage 35 leading to the seat of slide valve 11, a service reservoir is connected to pipe 36 and passage 37, and an emergency reservoir is connected to pipe 38 and passage 39 opening into emergency valve chamber 40.

Air charged into the train pipe 10 flows through passage 9 to piston chamber 8 and also to piston chamber 15 and from chamber 15 through passage 41, past check valve 42, and through port 43 in equalizing slide valve 11 to valve chamber 13. Air from chamber 13 flows through ports 54 and 44 and passage 45 past check valve 46 to emergency reservoir passage 39 and pipe 38 and also past check valve 46 to passage 47 and through cavity 48 in slide valve 11 to passage 49 leading to service reservoir charging valve 50. Air from piston chamber 15 also flows through feed groove 51 to valve chamber 18 and thence through passage 52 and cavity 53 in slide valve 11 to passage 55 leading to one side to charging valve 50 and also to passage 35 leading to pressure chamber 34. The pressure of fluid in the pressure chamber shifts the charging valve 50 to the position shown in Fig. 1 and fluid is then supplied through passage 49, around the charging valve 50, to passage 56 which connects with passage 37 leading to the service reservoir pipe 36.

In order to effect a service application of the brakes, a gradual reduction in train pipe pressure is made, and without describing the preliminary action of the parts, which does not concern the present invention, it may be stated that both pistons 7 and 14 finally assume service application position, in which air is supplied to the application chamber 20 through port 57 and passage 58. The application piston 19 is thereupon actuated to close the service cylinder exhaust valve 23 and open the application valve 21 so that fluid is supplied from the service reservoir to the service brake cylinder. If in making a service application of the brakes the pressure in the pressure chamber 34 becomes reduced to the equalizing point by flow to the application chamber, a further reduction in train pipe pressure will not cause a reduction in pressure in valve chamber 13 and the equalizing piston 7 then moves out beyond the usual service application position to the over-reduction position shown in Fig. 2. In this position, port 57 in slide valve 11 registers with passage 59, leading to the reduction limiting reservoir 60. Air is then vented from valve chamber 13 and pressure chamber 34 to the reduction limiting reservoir 60. When the pressure in valve chamber 13 has reduced by flow to the reduction reservoir to a point slightly less than the reduced train pipe pressure, the piston 7 moves the graduating slide valve 12 to close the port 57. Further reductions in train pipe pressure operate in a similar manner to effect a reduction in pressure in the pressure chamber and valve chamber 13, until the pressure in the pressure chamber equalizes with that in the reduction limiting reservoir, then the parts shift to emergency position and cause an emergency application of the brakes.

As so far described, the operation corresponds substantially with that of the construction covered in my prior application, Serial No. 618,218, hereinbefore referred to.

According to my present improvement, a second application portion 61 is provided, comprising an application piston 62 contained in piston chamber 63, connected by passage 64 to the reduction limiting reservoir 60. The piston 62 operates an exhaust valve 65 contained in valve chamber 66 and an application valve 67 contained in valve chamber 68 which is connected by passage 69 to a source of fluid pressure, such, for example, as the emergency reservoir, as shown in the drawings.

Passage 70 leads from the emergency brake cylinder pipe 32 to valve chamber 66 so that the application portion 61 controls the admission and release of fluid to and from the emergency brake cylinder.

In operation, upon an over-reduction in train pipe pressure, the equalizing portion 2 moves out to the position shown in Fig. 2, as hereinbefore described, and fluid is vented from valve chamber 13 and the pressure chamber 34 to the reduction limiting reservoir 60, but as the limiting reservoir is connected by passage 64 with the piston chamber 63 of the application piston 62, it will be seen that the same pressure exists on said piston as is admitted to the limiting reservoir. The piston 62 is thus operated by the pressure of fluid in the limiting reservoir to close the exhaust valve 65, which valve normally connects the valve chamber 66 and the emergency brake cylinder to exhaust passage 71, and opens the application valve 67 to supply air from the source of pressure, connected to valve chamber 68, to the emergency brake cylinder. When air supplied to the emergency brake cylinder and acting on the inner face of piston 62 equals or slightly exceeds the pressure in the reduction limiting reservoir, the application valve is moved to lap position by the piston 62. Further movements of the equalizing piston 7 caused by further reductions in train pipe pressure effect increases in pressure in the limiting reservoir and consequently on the piston 62 and the same is actuated to open the application valve 67 and supply fluid to the emergency brake cylinder to correspond with the pressure admitted to the reduction limiting reservoir.

The maximum degree of pressure obtainable in the emergency brake cylinder in the over-reduction position depends upon the point at which the pressure chamber and the reduction limiting reservoir equalize, and preferably the limiting reservoir is of such size as compared with the pressure chamber that the equalizing point is about 60 pounds, when using 110 pounds train pipe pressure.

If the train pipe pressure is reduced below the point at which the above equalization takes place, the release piston 14 is shifted to emergency position, in which passage 72 leading to one side of emergency piston head 26 is connected by cavity 73 in release slide valve 16 with exhaust port 74. The emergency portion 5 is thereupon shifted to emergency position and the emergency brake cylinder passage 33 is directly connected to the emergency reservoir through valve chamber 40 and passage 39. Full equalization of the emergency reservoir into the emergency brake cylinder then takes place.

All chambers, reservoirs, and brake cylinders equalizing in emergency position, the pressure in the reduction limiting reservoir also rises to the final equalizing pressure and the application piston 62 is thus held in open position until the final equalization of pressures takes place and then the parts move to lap position.

In releasing the brakes after an over-reduction, the service brake cylinder releases as usual and the emergency brake cylinder releases by way of passage 70 and the exhaust port 71 controlled by the release valve 65, it being understood that the reduction limiting reservoir 60 and the application piston chamber 63 are connected by passage 59 through cavity 75 in slide valve 11 with exhaust port 76 when the equalizing piston 7 is shifted to release position.

It will now be evident that by means of my improvement, the braking power may be gradually increased to any desired degree above the usual maximum service braking power upon reductions in train pipe pressure below the usual equalizing point.

While my improvement is shown applied to a control valve mechanism similar to that covered in my prior pending application Serial No. 618,218 hereinbefore referred to, it will be understood that the same may be employed in connection with other valve mechanisms in which there is an over-reduction position for venting air to a reduction limiting reservoir.

Having now described my invention, what I claim as new and desire to secure by Letters Patent, is:—

1. In a fluid pressure brake, the combination with a train pipe, of a valve device operating upon gradual reductions in train pipe pressure to the equalizing point for applying the brakes and means operating upon a gradual reduction in train pipe pressure below the equalizing point for applying the brakes with increased power corresponding with the amount of said gradual reduction.

2. In a fluid pressure brake, the combination with a train pipe and two brake cylinders, of a valve device operating upon gradual reductions in train pipe pressure to the usual equalizing point for supplying fluid to one brake cylinder and means operating upon a gradual reduction in train pipe pressure below the equalizing point for supplying fluid to the other brake cylinder in gradual amounts corresponding with the degree of reduction in train pipe pressure.

3. In a fluid pressure brake, the combination with a train pipe and two brake cylinders, of a pressure chamber, an application valve mechanism having an application chamber and operated by the initial admission of fluid from the pressure chamber to the application chamber for supplying fluid to one brake cylinder, and a second application valve mechanism having an application chamber and operated by a further admission of fluid from the pressure chamber to the second application chamber for supplying fluid to the other brake cylinder to apply the brakes with increased power.

4. In a fluid pressure brake, the combination with a train pipe and two brake cylinders, of an application valve mechanism having an application chamber, variations in pressure in which operate the valve mechanism to supply fluid to one brake cylinder, a second application valve mechanism having an application chamber variations in pressure in which operate the valve mechanism to supply fluid to the other brake cylinder, and a valve device operated by gradual reductions in train pipe pressure for varying the pressure in one application chamber and then in the other.

5. In a fluid pressure brake, the combination with a train pipe and two brake cylinders, of an application valve mechanism having an application chamber, an increase in pressure in which operates the valve mechanism to supply fluid to one brake cylinder, a second application valve mechanism having an application chamber, an increase in pressure in which operates to supply fluid to the other brake cylinder, and a valve device subject to the opposing pressures of the train pipe and a pressure chamber and operating upon gradual reductions in train pipe pressure to supply fluid from the pressure chamber to one application chamber and then to the other.

6. In a fluid pressure brake, the combination with a train pipe and two brake cylinders, of an application valve mechanism having an application chamber, an increase in pressure in which operates the valve mechanism to supply fluid to one brake cylinder, a second application valve mechanism having an application chamber, an increase in pressure in which operates to supply fluid to the other brake cylinder, and a valve device subject to the opposing pressures of the train pipe and a pressure chamber and operating upon gradual reductions in train pipe pressure to supply fluid from the pressure chamber to one application chamber to the point of equalization and to then supply fluid from the pressure chamber to the other application chamber to the point of equalization between the pressure chamber and the second application chamber.

7. In a fluid pressure brake, the combination with a train pipe, of an application valve mechanism subject to the opposing pressures of a brake cylinder and an application chamber for controlling the supply of fluid to the brake cylinder, a second application valve mechanism subject to the opposing pressures of a brake cylinder and an application chamber for controlling the supply of fluid to the brake cylinder, and a valve device operated by gradual reductions in train pipe pressure for supplying fluid to said application chambers.

8. In a fluid pressure brake, the combination with a train pipe and two brake cylinders, of an application valve mechanism subject to the opposing pressures of an application chamber and one brake cylinder for controlling the supply of fluid to said brake cylinder, a second application valve mechanism subject to the opposing pressures of an application chamber and the other brake cylinder for controlling the supply of fluid to the second brake cylinder, and a valve device operated by gradual reductions in train pipe pressure for supplying fluid to said application chambers.

9. In a fluid pressure brake, the combination with a train pipe and two brake cylinders, of an application valve mechanism subject to the opposing pressures of an application chamber and one brake cylinder for controlling the supply of fluid to said brake cylinder, a second application valve mechanism subject to the opposing pressures of an application chamber and the other brake cylinder for controlling the supply of fluid to the second brake cylinder, and a valve device subject to the opposing pressures of the train pipe and a pressure chamber and operating upon gradual reductions in train pipe pressure for supplying fluid from the pressure chamber to one application chamber and then to the other.

10. In a fluid pressure brake, the combination with a train pipe and two brake cylinders, of an application valve mechanism subject to the opposing pressures of an application chamber and one brake cylinder for controlling the supply of fluid to said brake cylinder, a second application valve mechanism subject to the opposing pressures of an application chamber and the other brake cylinder for controlling the supply of fluid to the second brake cylinder, and a valve device subject to the opposing pressures of the train pipe and a pressure chamber and operating upon gradual reductions in train pipe pressure for supplying fluid from the pressure chamber to one application chamber to the point of equalization between said chambers and for then supplying fluid from the pressure chamber to the other application chamber to the point of equalization between the pressure chamber and the second application chamber.

11. In a fluid pressure brake, the combination with a train pipe and two brake cylinders, of a valve mechanism operating upon gradual reductions in train pipe pressure to a predetermined degree for supplying fluid first to one brake cylinder and then upon further gradual reductions to the other brake cylinder in a service application of the brakes.

12. In a fluid pressure brake, the combination with a train pipe, of a valve device comprising a piston subject to the opposing pressures of the train pipe and a chamber, a main valve and an auxiliary valve operated thereby, a reduction limiting reservoir, said auxiliary valve being operated by said piston upon a reduction in train pipe pressure below the equalizing point for venting fluid from said chamber to the reduction limiting reservoir, and means controlled by the pressure in said reservoir for applying the brakes with increased power.

13. In a fluid pressure brake, the combination with a train pipe, of a valve mechanism operated upon gradual reductions in train pipe pressure down to one predetermined degree to apply the brakes with limited braking power, means operating upon further gradual reductions in train pipe pressure down to another predetermined degree to apply the brakes with increased power, and means operating upon a still further reduction in train pipe pressure to apply the brakes with the maximum power.

14. In a fluid pressure brake, the combination with a train pipe, of an application valve device for supplying fluid to apply the brakes with limited power, a second application valve device for supplying fluid to apply the brakes with increased power, an emergency valve device for supplying fluid to apply the brakes with maximum power, and valve means operated by variations in train pipe pressure for controlling said application valve devices and said emergency valve device.

In testimony whereof I have hereunto set my hand.

WALTER V. TURNER.

Witnesses:
  A. M. CLEMENTS,
  C. V. McCURDY.

Copies of this patent may be obtained for five cents each, by addressing the "Commissioner of Patents Washington, D. C."